US012124520B2

(12) United States Patent
Le Toquin et al.

(10) Patent No.: US 12,124,520 B2
(45) Date of Patent: Oct. 22, 2024

(54) AUXILIARY CONTROL MECHANISMS FOR COMPLEX QUERY PROCESSING

(71) Applicant: AMADEUS S.A.S., Biot (FR)

(72) Inventors: Youri Thibault Marie Le Toquin, Nice (FR); Paolo Iannino, Antibes (FR)

(73) Assignee: AMADEUS S.A.S., Biot (FR)

( * ) Notice: Subject to any disclaimer, the term of this patent is extended or adjusted under 35 U.S.C. 154(b) by 252 days.

(21) Appl. No.: 17/462,921

(22) Filed: Aug. 31, 2021

(65) Prior Publication Data

US 2022/0171816 A1 Jun. 2, 2022

(30) Foreign Application Priority Data

Nov. 27, 2020 (EP) .................................... 20306456

(51) Int. Cl.
*G06F 16/93* (2019.01)
*G06F 9/30* (2018.01)
*G06F 16/9035* (2019.01)
*G06F 16/9038* (2019.01)
*G06Q 10/02* (2012.01)

(52) U.S. Cl.
CPC .......... *G06F 16/93* (2019.01); *G06F 9/30036* (2013.01); *G06F 16/9035* (2019.01); *G06F 16/9038* (2019.01); *G06Q 10/02* (2013.01)

(58) Field of Classification Search
CPC .. G06F 16/9038; G06F 16/93; G06F 16/9532; G06F 9/30036; G06Q 10/02
See application file for complete search history.

(56) References Cited

U.S. PATENT DOCUMENTS

| | | | |
|---|---|---|---|
| 2010/0262454 A1 | 10/2010 | Sommer et al. | |
| 2011/0179002 A1 | 7/2011 | Dumitru et al. | |
| 2011/0202528 A1* | 8/2011 | Deolalikar | G06F 16/355 |
| | | | 707/E17.046 |
| 2012/0173468 A1* | 7/2012 | Gillam | G06N 3/126 |
| | | | 706/13 |
| 2018/0330729 A1* | 11/2018 | Golipour | G10L 15/26 |

OTHER PUBLICATIONS

Bojanski, Piotr, et al. "Enriching word vectors with subword information." Transactions of the Association for Computational Linguistics 5 (2017): 135-146.

(Continued)

*Primary Examiner* — Taelor Kim
(74) *Attorney, Agent, or Firm* — Perry + Currier Inc.

(57) ABSTRACT

A method includes: receiving, from a client device, a data request containing a structured document; generating a set of numerical vectors representing the structured document; providing the set of numerical vectors to an auxiliary controller for generation of a predicted attribute of response data providing the search request to a primary response generator for generation of the response data; determining, at the auxiliary controller, whether the predicted attribute satisfies a modification criterion; and when the determination is affirmative, transmitting a modification command to the primary response generator to truncate the generation of the response data.

15 Claims, 9 Drawing Sheets

(56) References Cited

OTHER PUBLICATIONS

Akbik, Alan et al.. "Contextual string embeddings for sequence labeling." Proceedings of the 27th international conference on computational linguistics. 2018.

Wu, Lingfei, et al. "Word mover's embedding: From word2vec to document embedding." arXiv preprint arXiv:1811.01713 (2018).

Zhang, Xiang et al. "Character-level convolutional networks for text classification." Advances in neural information processing systems 28 (2015): 649-657.

Joulin, Armand, et al. "Bag of tricks for efficient text classification." arXiv preprint arXiv:1607.01759 (2016).

Mikolov, Tomas, et al. "Efficient estimation of word representations in vector space." arXiv preprint arXiv:1301.3781 (2013).

Ye, Xinfeng et al. "A Natural Language-based Flight Searching System." 2020 5th International Conference on Computational Intelligence and Applications (ICCIA). IEEE, 2020.

Kim, Yoon, "Convolutional Neural Networks for Sentence Classification", arXiv:1408.5882v2, Sep. 3, 2014, downloaded from URL: https://paperswithcode.com/paper/convolutional-neural-networks-for-sentence.

Nishimura, Toshiro, "Attacking Deep Learning-Based NLP Systems with Malicious Word Embeddings", Mar. 3, 2019, static.sched.com.

Peters, Matthew et al., "Deep contextualized word representations", arXiV:1802.05365v2, Mar. 22, 2018.

Alon, Uri et al., code2vec: "Learning Distributed Representations of Code" arXiv: 1803.09473v5, Oct. 30, 2018.

Mikolov, Tomas, et al. "Distributed representations of words and phrases and their compositionality." Advances in neural information processing systems. 2013.

Cer, Daniel, et al. "Universal sentence encoder." arXiv preprint arXiv:1803.11175 (2018).

Ruckle, Andreas, et al. "Concatenated power mean word embeddings as universal cross-lingual sentence representations." arXiv preprint arXiv:1803.01400 (2018).

* cited by examiner

AUXILIARY CONTROL MECHANISMS FOR COMPLEX QUERY PROCESSING

CROSS-REFERENCE TO RELATED APPLICATION

This application claims priority from European Patent Application no. 20306456.3, filed Nov. 27, 2020, the contents of which is incorporated herein by reference.

FIELD

The specification relates generally to generating response data for complex queries, and specifically to auxiliary control mechanisms for such response generation.

BACKGROUND

A wide variety of computing systems are responsible for received requests for data, e.g. from client devices, and providing responses to such requests. However, while returning response data is relatively straightforward in some systems, such as those storing indexed sets of documents to be retrieved by client devices, others are more complex. Some systems, for example, generate response data rather than simply retrieving previously indexed response data based. An example of such a system is a search and/or booking system for travel products, such as airline flights. Incoming queries to such a system typically contain numerous input values, and responses to such queries are generated from source data that can be combined to produce a large number of possible responses.

That is, a plurality of possible combinations of flight segments may each sufficiently match the input values. Each such combination is computed, often from distinct sources of response data, and the possible matches may also be evaluated for relevance before return to the client device. The generation of response data in such systems, in other words, is computationally demanding and therefore time-consuming.

SUMMARY

An aspect of the specification provides a method, comprising: maintaining a library of vectors each corresponding to one of a set of categorical tokens; receiving a search request containing a multi-level structured document; extracting a subset of the categorical tokens from the multi-level structured document; generating a subset of the vectors defining the document, by: (i) for each token in the subset, retrieving a corresponding one of the vectors from the library, and (ii) combining the retrieved vectors; providing the search request to a primary response generator; providing the subset of vectors to a predictor module; and based on an output of the predictor module, determining whether to trigger a modification for the primary response generator.

Another aspect of the specification provides a computing device, comprising: a communications interface; a memory maintaining a library of vectors each corresponding to one of a set of categorical tokens; and a processor configured to: receive, via the communications interface, a search request containing a multi-level structured document; extract a subset of the categorical tokens from the multi-level structured document; generate a subset of the vectors defining the document, by: (i) for each token in the subset, retrieving a corresponding one of the vectors from the library, and (ii) combining the retrieved vectors; provide the search request to a primary response generator; provide the subset of vectors to a predictor module; and based on an output of the predictor module, determine whether to trigger a modification for the primary response generator.

BRIEF DESCRIPTIONS OF THE DRAWINGS

Embodiments are described with reference to the following figures.

DETAILED DESCRIPTION

Figure 1:
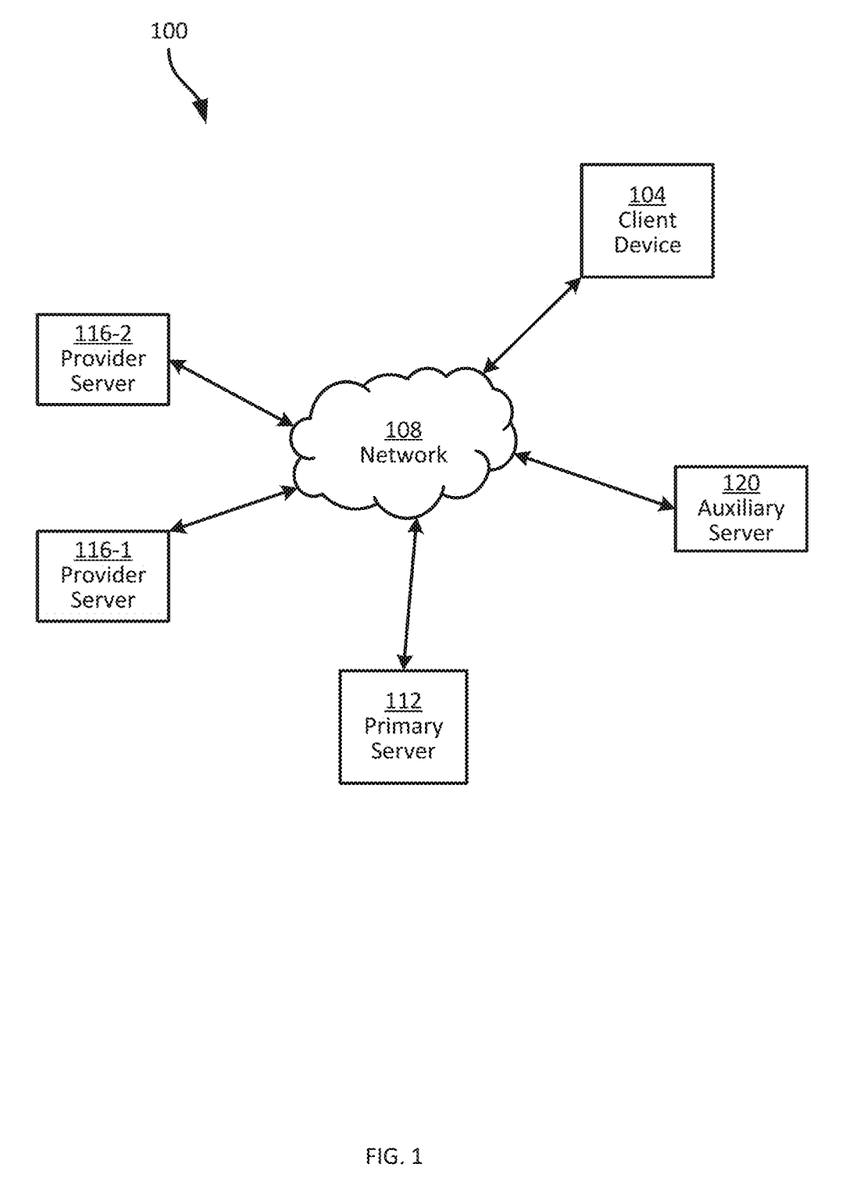
FIG. 1 is a diagram of a system for data request processing.

FIG. 1 depicts a system 100 for data request processing. The system 100 includes a client device 104 connected with a network 108 including any suitable combination of local and wide-area networks, including the Internet. The client device 104 is a computing device, such as a desktop computer, tablet computer, smartphone, or the like, configured to submit data requests for processing by a primary server 112 via the network 108. As will be apparent, the system 100 may include a plurality of client devices, but only one such device 104 is shown for simplicity.

The primary server 112, in turn, is configured to generate responses to such requests and return the responses to the client device 104. The nature of the data contained in the requests and responses is not particularly limited. For example, the requests from the client device 104 can include search parameters for travel products, such as flights, hotel reservations, and the like. The client device 104 may be operated by an individual traveler, a travel agent, or the like.

In such examples, the responses include data defining flights (or other travel products) that match the requested parameters. As will be apparent to those skilled in the art, the search parameters can include travel dates, departure and arrival locations, numbers of travelers, and the like. The results, meanwhile, may be drawn from numerous sources of response data, including provider servers 116-1, and 116-2. The system 100 may include additional provider servers 116 in other examples.

The provider servers 116 may be operated by airlines, centralized ticketing repositories, or a combination thereof. The generation of responses that are relevant to the received search parameters, e.g. by the primary server 112 itself or by the provider servers 116, is a computationally complex task, as numerous distinct flight segments or combinations of flight segments may satisfy the search parameters. The primary server 112, for example, may be configured to retrieve data defining flight segments, and to generate a (potentially large) set of segment combinations that satisfy the search parameters. The primary server 112 may then be configured to rank or otherwise organize the segments, before providing at least a portion of the segments to the client device 104 via the network 108.

The client device 104, in turn, may be operated to select one or more of the above results for further information or booking. If response data is not received from the server 112 within a certain time frame, however, the operator of the client device 104 may abandon the request (e.g. close a browser application, navigate to another service provider, or the like). The computational resources deployed by the primary server 112 to generate response data are therefore wasted. Due to the wide variability of request parameters and the complexity of the response generation process, identifying search requests that may lead to abandonment by the client device 104 is difficult, however.

To that end, the system 100 also includes an auxiliary server 120 connected to the network 108. The auxiliary server 120 may, in other examples, be implemented as one or more additional modules of the server 112 itself, but is illustrated separately for clarity herein.

The auxiliary server 120, in brief, is configured to apply one or more control mechanisms to the response generation process of the primary server 112. As will be discussed below, the control mechanisms implemented by the auxiliary server 120 may reduce the computational load on the primary server 112 and/or the provider servers 116 during the generation of response data. In some examples, the control mechanisms may therefore reduce the time elapsed between the receipt of a data request and the provision of response data to the client device 104. The auxiliary server 120 may also apply control mechanisms to reduce the likelihood of abandonment by the client device 104, or mitigate the cost of such abandonment to the server 112.

The search request from the client device 104, as well as the response data generated by the primary server 112 and/or the provider servers 116, can include both numerical data and non-numerical data. Both the search request and portions of the response data or intermediate response data can form part of the inputs to the control mechanisms implemented by the auxiliary server 120. To enable the use of certain processing techniques, such as deep learning networks, the auxiliary server 120 is also configured to encode the input data to the control mechanisms as entirely numerical data. That is, the auxiliary server 120 is configured, as will be described below in greater detail, to consume structured documents such as XML-based documents, Javascript Object Notation (JSON) documents, and the like, and autonomously encode such documents in a form that is usable by deep learning networks and other mechanisms that operate solely on numerical data.

Before discussing the operation of the primary server 112 and the auxiliary server 120 in greater detail, certain internal components of the servers 112 and 120 will be described in greater detail, with reference to FIGS. 2A and 2B.

Figure 2A:
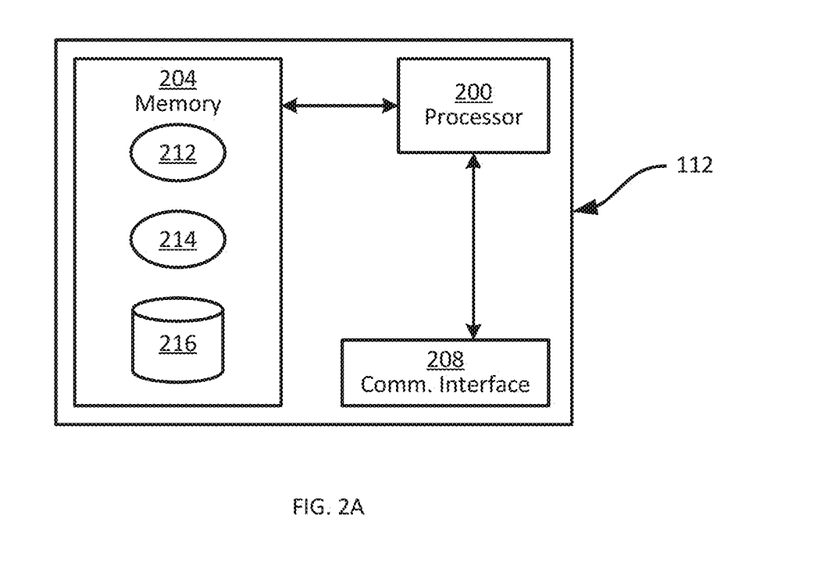
FIG. 2A is a diagram of certain internal components of the primary server of FIG. 1.

Referring in particular to FIG. 2A, the primary server 112 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communications interface 208, which enables the primary server 112 to communicate with the other computing devices of the system 100 via the network 108. The communications interface 208 therefore includes any necessary components (e.g. network interface controllers (NICs), radio units, and the like) to communicate via the network 108. The specific components of the communications interface 208 are selected based on upon the nature of the network 108. The primary server 112 can also include input and output devices connected to the processor 200, such as keyboards, mice, displays, and the like (not shown).

The components of the primary server 112 mentioned above can be deployed in a single enclosure, or in a distributed format. In some examples, therefore, the primary server 112 includes a plurality of processors, either sharing the memory 204 and communications interface 208, or each having distinct associated memories and communications interfaces.

The memory 204 stores a plurality of computer-readable programming instructions, executable by the processor 200, in the form of various applications, including a data request routing application 212, and a primary response generator application 214. As will be understood by those skilled in the art, the processor 200 executes the instructions of the applications 212 and 214 (and any other suitable applications) in order to perform various actions defined by the instructions contained therein. In the description below, the processor 200, and more generally the primary server 112, are said to be configured to perform those actions. It will be understood that they are so configured via the execution (by the processor 200) of the instructions of the applications stored in memory 204.

Execution of the application 212 configures the primary server 112 to receive data requests from the client device 104 and route the requests to various other components of the system 100, including the primary response generator 214 (which may also, in other examples, be implemented as a separate computing device) and the auxiliary server 120.

Execution of the application 214, as will be discussed below, configures the primary server 112 to process data requests from the client device 104 to generate response data for return to the client device 104. Generation of response data via execution of the application 214 can include providing the request, or portions thereof, to the provider servers 116. The operation of the application 214 can also be modified by commands from the auxiliary server 120, as will be discussed below.

The memory 204 also stores a repository 216, which may contain source data used in the generation of response data. For example, the repository 216 can contain identifiers of the provider servers 116, user profiles corresponding to client devices, and the like.

Figure 2B:
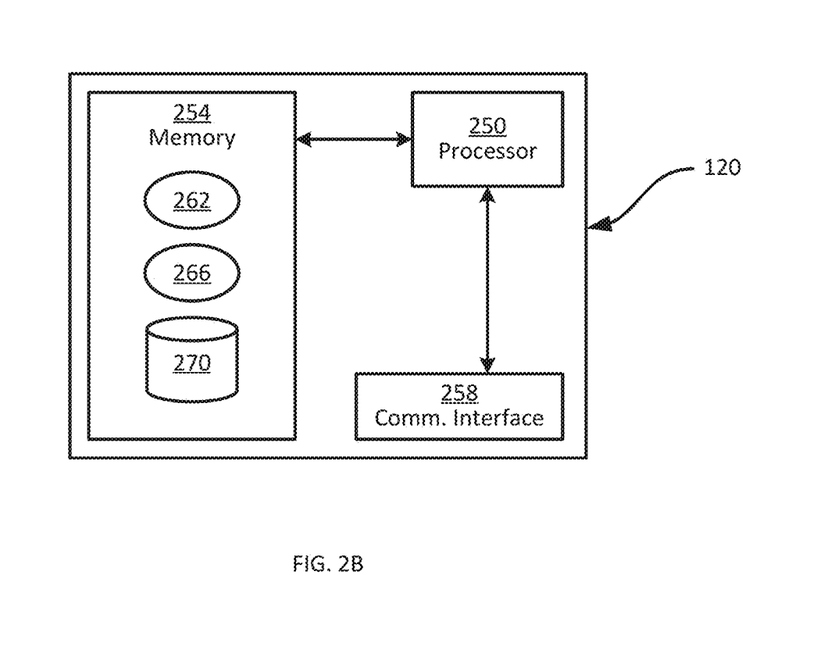
FIG. 2B is a diagram of certain internal components of the auxiliary server of FIG. 1.

Turning to FIG. 2B, the auxiliary server 120 includes at least one processor 250, such as a central processing unit (CPU) or the like. The processor 250 is interconnected with a memory 254, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 250 and the memory 254 are generally comprised of one or more integrated circuits (ICs).

The processor 250 is also interconnected with a communications interface 258, which enables the auxiliary server 120 to communicate with the other computing devices of the system 100 via the network 108. The communications interface 258 therefore includes any necessary components (e.g. network interface controllers (NICs), radio units, and the like) to communicate via the network 108. The specific components of the communications interface 258 are selected based on upon the nature of the network 108. The auxiliary server 120 can also include input and output devices connected to the processor 250, such as keyboards, mice, displays, and the like (not shown).

The components of the auxiliary server 120 mentioned above can be deployed in a single enclosure, or in a distributed format. In some examples, therefore, the auxiliary server 120 includes a plurality of processors, either sharing the memory 254 and communications interface 258, or each having distinct associated memories and communications interfaces.

The memory 254 stores a plurality of computer-readable programming instructions, executable by the processor 250. The instructions stored in the memory 254 include an encoding application 262, and a response modification application 266. The encoding application 262 is configured to receive structured documents from the primary server 112, such as data requests received from the client device 104, intermediate response data, and the like, and to encode such documents as numerical data for consumption by the application 266. The modification application 266, in turn, configures the processor 250 to process the encoded data received from the encoder application 262 to generate various predicted attributes of the response data being generated by the primary server 112. The server 120, as configured via the execution of the application 266, may also be referred to as an auxiliary controller. Based on the predicted attributes of the response data, the application 266 further configures the processor 250 to select modifications to the generation of response data by the primary server 112, e.g. to accelerate the provision of response data to the client device 104, limit the computational impact of response generation on the primary server 112, and the like.

The memory 254 also stores a repository 270 of vector representations of tokens, employed by the application 262 to convert data received from the server 112 for consumption by the application 266.

In some embodiments, as noted earlier, the servers 112 and 120 may be deployed as a single server, e.g. executing each of the applications 212, 262, and 266. In other examples, the functionality of any one or more of the applications 212, 262 and 266 may be implemented using pre-programmed hardware or firmware elements (e.g., application specific integrated circuits (ASICs), electrically erasable programmable read-only memories (EEPROMs), etc.), or other related components.

Figure 3:
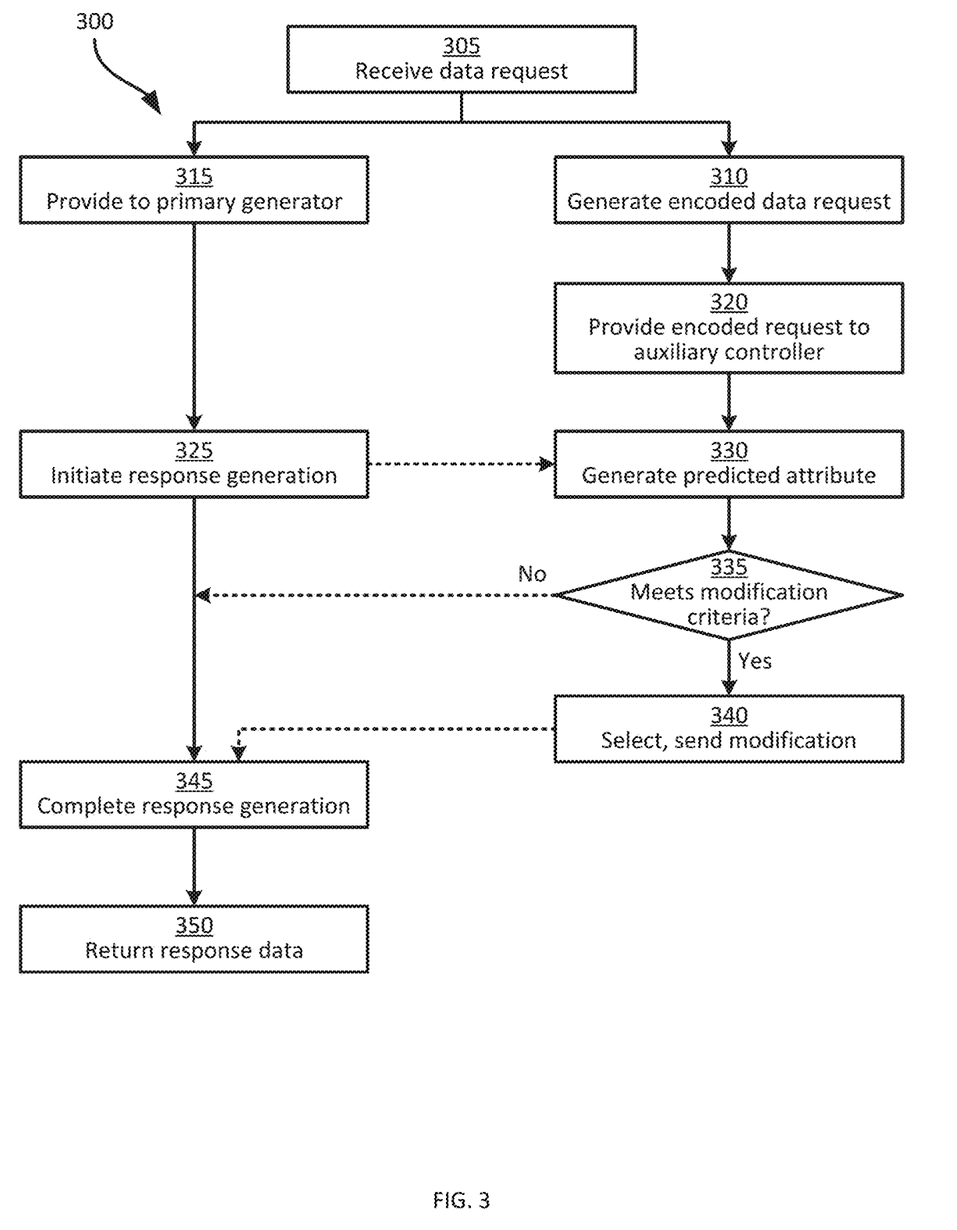
FIG. 3 is a flowchart of a method of controlling the generation of response data.

Turning to FIG. 3, the functionality of the system 100 will be described in further detail. FIG. 3 illustrates a method 300 of controlling the generation of response data, particularly for complex data requests involving the processing of categorical data (e.g. including text strings and other non-numerical data). Certain steps in the method 300 are performed by the primary server 112, while other steps are performed by the auxiliary server 120, as will be apparent in the discussion below.

At block 305, the primary server 112 is configured to receive a data request, e.g. from the client device 104. The client device 104 may, for example, enter search parameters in a web or other interface hosted by the server 112, generate a message for transmission to the server 112, or the like. In particular, the request is received by the routing application 212. The data request can contain a wide variety of information, but in the present example it is assumed that the data request is a search request for airline flights, e.g. submitted by a travel agency on behalf of a traveler. The request includes a structured document, e.g. formatted according to the EDIFACT standard. A wide variety of other formats may also be employed by the request, including other XML-based documents, JSON documents, and the like.

The routing application 212 is configured, upon receipt of the data request, to provide the request to the auxiliary server 120 for encoding at block 310, and to provide the request to the primary response generator 214 at block 315. Provision of the request to the primary response generator 214 at block 315 can be substantially simultaneous with provision of the request to the auxiliary server 120 and block 310.

Figure 4:
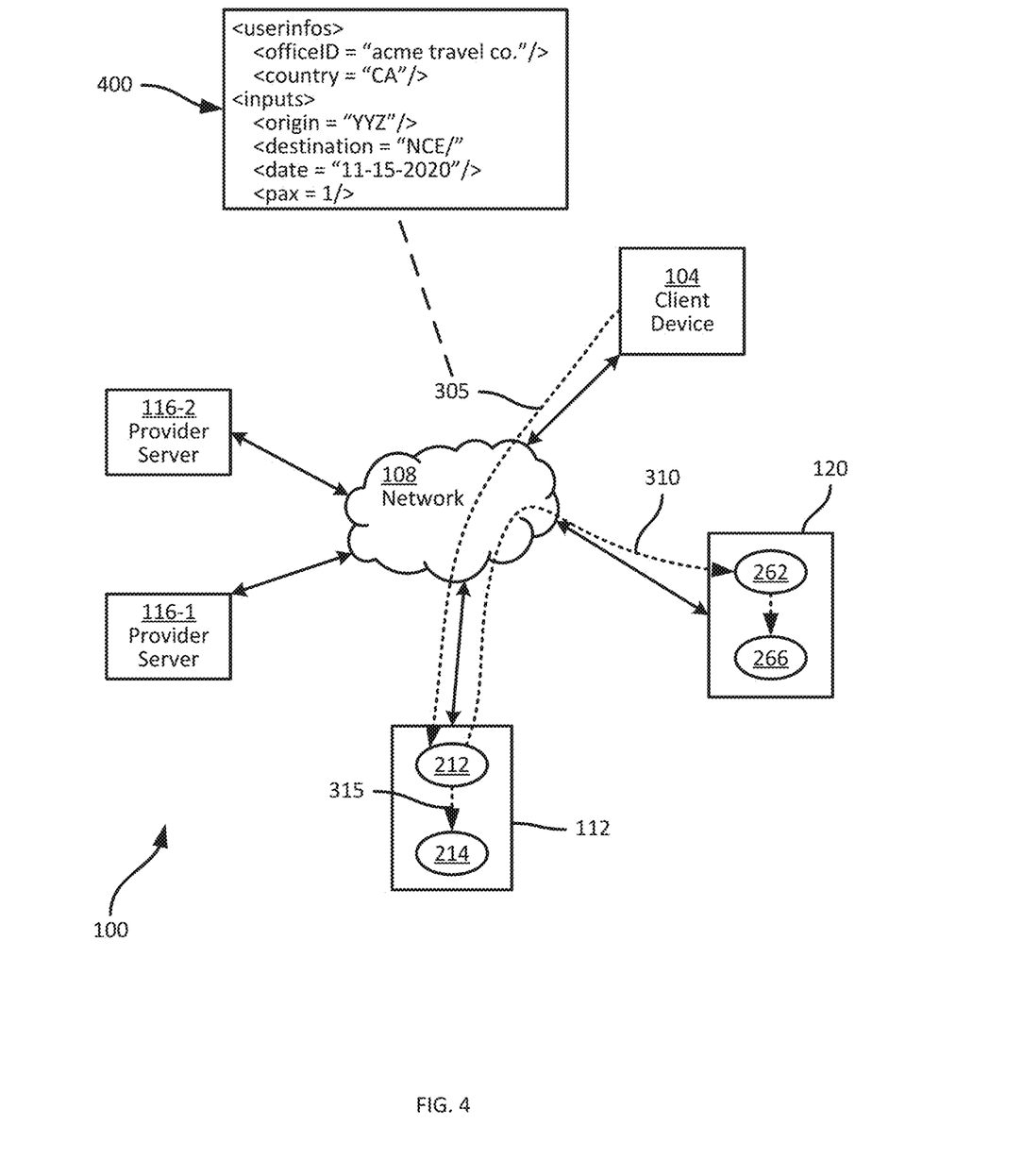
FIG. 4 is a diagram illustrating example performances of blocks 305, 310 and 315 of the method of FIG. 3.

FIG. 4 illustrates example performances of blocks 305, 310, and 315. In particular, FIG. 4 illustrates the transmission of an example search request 400 from the client device 104 at the primary server 112 via the network 108 at block 305. Having received the request 400, the primary server 112 (and specifically, the routing application 212) provides the request 400 to the auxiliary server 120 for encoding at block 310, and to the primary response generator 214 at block 315.

The request 400, as shown in FIG. 4, is a structured document including a number of name-value pairs. In addition, the name-value pairs are organized hierarchically, e.g. with a client device identifier "acme travel co." and a client device location (e.g. the country label "CA") under a "userinfos" category, and search inputs under an "inputs" category. That is, the request 400 may be a multi-level document. In this example, the search inputs indicate that the client device 104 has requested flights between Toronto, Canada (YYZ) and Nice, France (NCE) on Nov. 15, 2020. As will be apparent to those skilled in the art, a wide variety of other search parameters can be defined in the request 400, including preferred airlines, time of day for flights, a range of dates, and so on. Similarly, a wide variety of additional client identification information can be present in the request, as well as various other routing parameters, header information, and the like, as will be understood by those skilled in the art. Further, the syntax and formatting of the request 400 can vary widely. For example, EDIFACT messages may employ characters such as the plus sign "+" to separate parameters therein.

Returning to FIG. 3, as noted above, at block 310 the auxiliary server 120 is configured to generate an encoded version of the data request 400 received at block 305. In general, the encoding process of block 310, which is also referred to as embedding, autonomously converts the structured document forming the original request 400 to numerical data in the form of a set of vectors. The set of vectors retains a significant portion of the meaning conveyed by the request 400, expressed using vectors with reduced dimensionality in comparison with, for example, one-hot encoding. As will be apparent to those skilled in the art, one-hot encoding categorical data such as the values shown in FIG. 4 may require vectors with many thousands of dimensions or more, rendering processing of such vectors intractable. Further, the encoding process described herein maintains statistical qualities of the input data, whereas one-hot encoding fails to preserve such qualities. For example, the distance between any pair of one-hot encoded tokens is constant, with the result that one-hot encoding fails to accurately represent relatedness of tokens.

Figure 5:
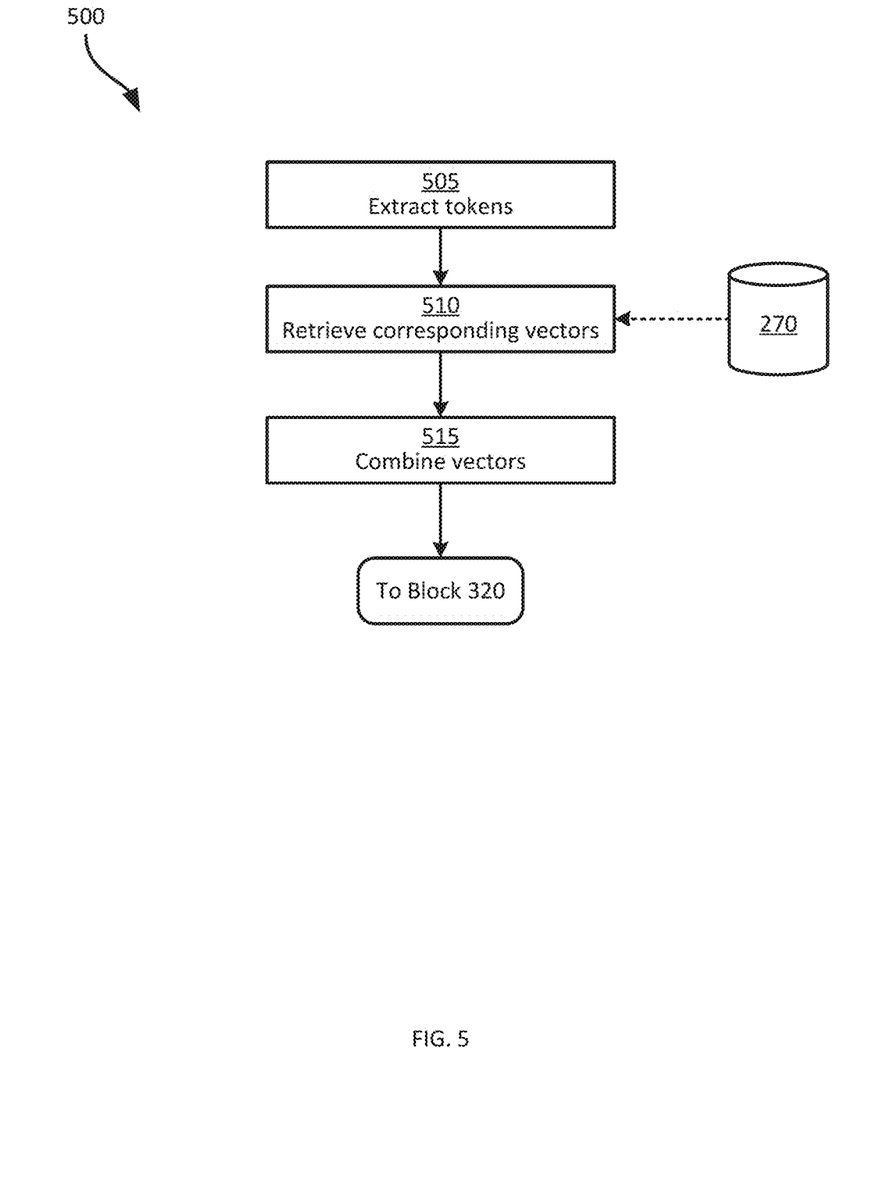
FIG. 5 is a flowchart of a method of performing block 310 of the method of FIG. 3.

The process employed by the auxiliary server 120 to encode the request 400 at block 310 is illustrated in FIG. 5, via a flowchart of an encoding method 500. In particular, at block 505 the auxiliary server 120 is configured to extract tokens corresponding to categorical data from the request 400. In general, the extraction of tokens at block 505 includes discarding various syntactical data from the request 400 to isolate the values such as those mentioned above in connection with FIG. 4.

The encoding application 262 may therefore, for example, apply rules to the request 400 based on a syntax of the request 400. For example, the encoding application 262 may discard separators such as the plus sign mentioned above, as well as carriage returns, greater-than and lesser-than characters and the like. Other data may also be discarded from the request 400, such as strings appearing with a frequency below a predefined lower threshold, and/or strings appearing with a frequency above a predefined upper threshold. In still further examples, specific strings may be discarded based on the known syntax of the request 400. For example, the value names such as "userinfos" may be explicitly identified for discarding in the above-mentioned rules.

At block 510, the encoding application 262 is configured to retrieve, for each extracted token, a corresponding vector from the repository 270. The repository 270 contains, for each of a wide variety of tokens (preferably the entire set of possible tokens across all requests 400), a vector defining the token in a predefined number of numerical dimensions. For example, each vector may include sixty-four values, corresponding to a 64-dimension numerical definition of the corresponding token. Each vector can be stored in the repository 270 indexed by token, and thus the retrieval of vectors for each token may simply involve querying the repository 270 with the relevant token.

Figure 6:
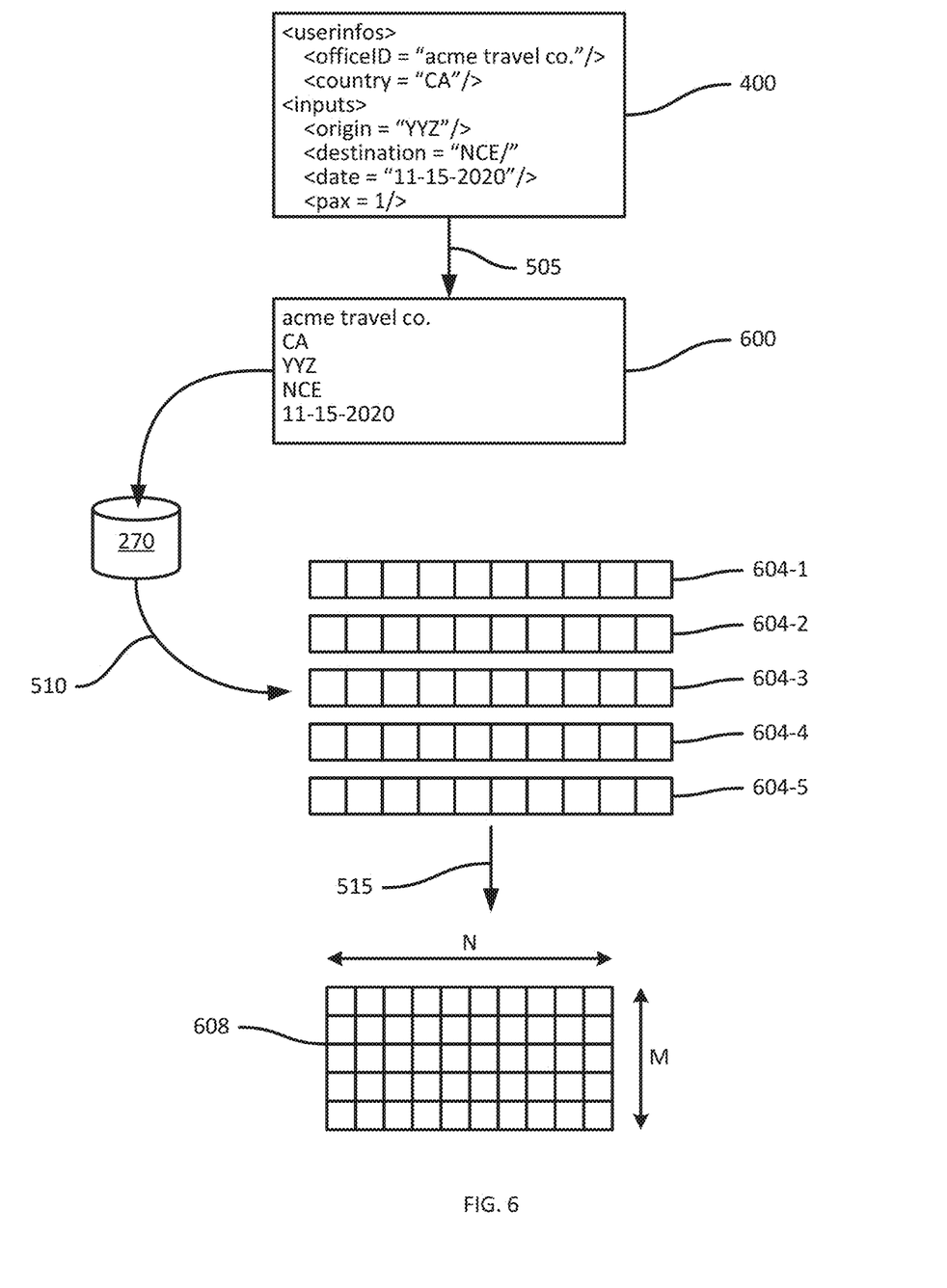
FIG. 6 is a diagram illustrating an example performance of the method of FIG. 5.

At block 515, the encoding application 262 is configured to combine the vectors retrieved at block 510, e.g. into a matrix, for further processing. Turning to FIG. 6, an example performance of the method 500 is illustrated with respect to the request 400.

In particular, the request 400 is shown at the top of FIG. 6. Via block 505 of the method 500, a set of tokens 600 is extracted from the request 400. As illustrated, the field delimiters "<" and ">", field identifiers, indents and other separating characters (e.g. the equal sign) have been discarded, leaving only a set of five field values. Numerical data is also discarded, such as in the case of the "pax" value, indicating a number of passengers. However, the date (Nov. 15, 2020) is retained in this example, despite being numerical. In other examples, the date may also be discarded.

Via block 510, a set of vectors 604-1, 604-2, 604-3, 604-4, and 604-5 are retrieved from the repository 270. The vector 604-1 contains a ten-dimensional numerical definition of the token "acme travel co.", while the remaining vectors 604 contain ten-dimensional numerical definitions of the remaining tokens in the set 600. The use of ten dimensions is purely for illustrative purposes, and the vectors 604 may employ a wide variety of other dimensions.

Via block 515, the encoding application 262 combines the vectors 604, e.g. to form a two-dimensional matrix 608 with dimensions M×N, where M is the number of tokens, and N is the length of each vector (ten elements, in this example). The matrix 608 is the result of the method 500, and is passed to the response modification application 266 for further processing.

As will now be apparent to those skilled in the art, before the method 500 can be performed, the repository 270 must be populated. Populating the repository 270 occurs prior to deployment of the system 100, and includes collecting a corpus of requests 400 (and optionally, other message types, depending on the process(es) performed by the response modification application 266) sufficiently large in number as to encompass every possible token expected to appear in subsequent requests such as the request 400. Each message in the corpus is pre-processed via block 505 to extract tokens. The set of tokens for each message is then used to learn the set of vectors representing each token. Various mechanisms may be applied to learn the vectors, including, for example, the fastText algorithm, the word2vec algorithm, or the like.

Returning to FIG. 3, the primary response generator 214 has been provided with the request 400, and the response modification application 266 (also referred to as the auxiliary controller 266) has been provided with the set of vectors 604 defining the request 400. The request 400 and the set of vectors 604 may then be processed in parallel to both generate response data corresponding to the request 400, and to generate modification data for use by the primary response generator 214.

At block 325, the primary response generator 214 is configured to initiate the generation of response data. The specific process or processes involved in the generation of response data are not directly relevant, and depend on the nature of the request 400 and the resulting response data. For example, the generation of response data for a request for flights, as in the case of the request 400, can include retrieving a user profile corresponding to the client device 104 from the memory 204 (e.g. from the repository 216), transmitting requests for source data or partial results to the provider servers 116, and performing other computations on such source data, or additional source data, at the primary server 112 itself.

Initiating the generation of response data includes performing at least a portion, and not the entirety, of the above-mentioned activities. As will be apparent, however, in other applications (e.g. to handle different types of data than data defining travel products), the generation of response data may include a different set of activities.

At block 330, substantially simultaneously with the initiation of response data generation by the primary server 112, the auxiliary server 120 (in particular, the auxiliary controller 266) is configured to generate a predicted attribute of the response data that has not yet been generated (or at least has not been fully generated) by the primary server 112. Various predicted attributes may be determined at block 330, examples of which will be described below in greater detail. In some examples, as indicated by the dashed line between block 325 and block 330, the predicted attribute may be generated based on not only the request 400, but also partial response data generated by the primary server 112. In other examples, the predicted attribute can be generated solely based on the request 400.

At block 335, the auxiliary server 120 is configured to determine whether the predicted attribute generated at block 330 satisfies one or more modification criteria, examples of which will be described below. When the determination at block 335 is negative, the auxiliary server 120 takes no further action. When the determination at block 335 is affirmative, however, the auxiliary server 120 selects a modification to the generation of response data at block 340, and transmits a modification command to the primary server 112.

The modification criteria, in general, define conditions that, when satisfied, indicate that the computational efficiency of the generation of response data may be improved, e.g. by modifying or terminating such generation. Modifications may accelerate the generation of response data, reduce the computational resources devoted to generation of response data, and/or implement interventions to reduce the likelihood of abandonment by the client device 104.

At block 345, the primary server 112 is configured to complete the generation of response data according to the process initiated at block 325, with any modifications applied by the auxiliary server 120, if any. Completing the generation of response data can include post-processing the response data, e.g. by ranking search results. Completion can also include actual computation of certain portions of the response data, such as by applying fare or other pricing rules to flight segments returned from the provider servers 116. In some examples, as will be described below, completion at block 345 can also include invoking a fallback response generation mechanism configured to generate results more quickly, with less accuracy (i.e. less well-matched to the request 400). At block 350, the primary server 112 is configured to return the response data from block 345 to the client device 104.

Illustrative examples will now be discussed of the predicted attributes generated at block 330, the modification criteria applied at block 335, and the modifications selected for transmission to the primary server 112 at block 340.

Figure 7:
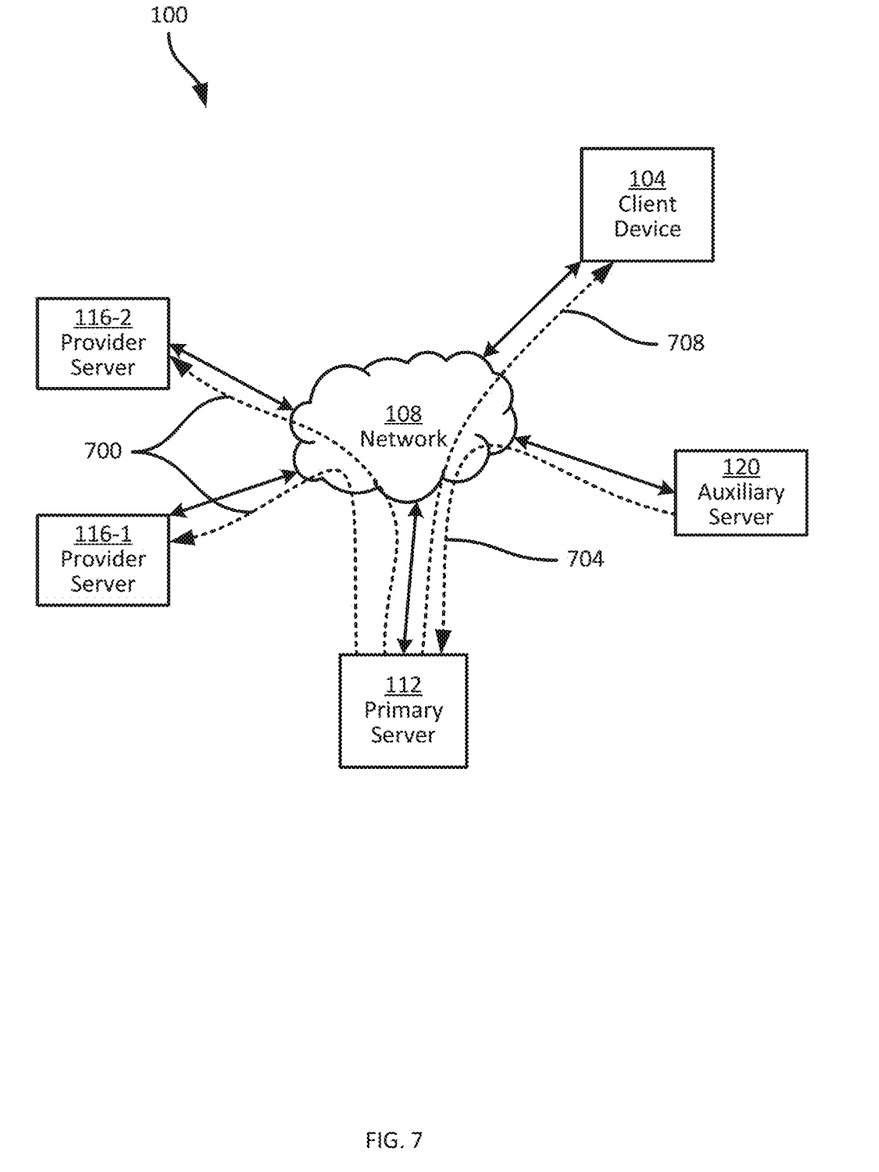
FIG. 7 is a diagram illustrating an example performance of the method of FIG. 3.

Turning to FIG. 7, in some examples, the predicted attribute generated at block 330 is a timeout likelihood. As noted earlier, the complexity of response data generation may lead to sufficient computing time at the provider servers 116 and/or the primary server 112 that the client device 104 abandons the search. The auxiliary server 120 can be configured, in some embodiments, to evaluate the request 400 to determine whether generation of response data is likely to exceed a predefined timeout period (e.g. 30 seconds, although other time periods may also be employed) beyond which client abandonment is likely. The assessment of timeout likelihood is performed while response data generation proceeds, and the response data generation process may therefore be modified when the timeout likelihood is high.

In particular, initiation of response data generation at block 325 can include transmitting requests 700 for partial search results and/or source data from the primary server 112 to the provider servers 116, as illustrated in FIG. 7. The auxiliary server 120, meanwhile (specifically the auxiliary controller 266) is configured to generate a likelihood that the generation of response data by the provider servers 116 and/or the primary server 112 will take longer than the predefined timeout period. The likelihood produced by the auxiliary server 120 can be a probability (e.g. between 0 and 1), or a binary classification, e.g. with one state indicating a likely timeout, and the other state indicating no timeout.

The auxiliary server 120 can deploy a wide variety of predictive models and/or classifiers to generate the predicted attribute at block 330. For example, the auxiliary server 120 can be configured to execute a deep learning network, such as a convolutional neural network (CNN) (e.g. a temporal, or 1-dimensional, CNN), a recurrent neural network (RNN) (e.g. a long short-term memory (LSTM) RNN), to generate the above-mentioned timeout likelihood. As will now be apparent, the encoding process detailed in connection with FIG. 5 enables the auxiliary server 120 to employ deep learning models which may otherwise be unavailable for the non-numerical data contained in the request 400. The encoding process thereby enables the use of deep learning techniques that mitigate or eliminate the need for feature selection by human operators of the system 100, instead automatically identifying relevant features from training data used to train the model prior to deployment of the system 100.

In the example illustrated in FIG. 7, it is assumed that the auxiliary server 120 determines, at block 330, that the response generation process initiated at block 325 is likely to timeout. The auxiliary server 120 therefore selects a modification to be applied to the generation of response data, and transmits a modification command 704 containing the modification to the primary server 112.

The modification can be, for example, a command to the primary server 112 to simply abort the generation of response data and the transmission of a message 708 to the client device indicating that no results are available. The primary server 112 may also transmit abandonment commands to the provider servers 116, since no response has yet been received from the provider servers 116. The client device 104 may therefore abandon the search, but the computational resources wasted may be reduced.

In other examples, the modification may be to invoke a fallback response generation mechanism, which may, for example, generate response data that is less likely to be relevant and/or accurate, but which consumes fewer computational resources. The fallback mechanism may be, for example, a process that retrieves cached prices for flight segments rather than computing pricing rules. The fallback response may be generated by another application at either of the servers 112 and 120, and may be referred to as an auxiliary response generator. In other examples, the fallback process may simply ignore certain search inputs to reduce the complexity of the response data generation. The message 708 to the client device 104 may therefore include the fallback response data. Meanwhile, the generation of response data initiated at block 325 may continue, such that updated results may be provided later to the client device 104. In other examples, the generation of response data initiated at block 325 may be aborted, i.e. replaced entirely by the fallback response data.

Figure 8:
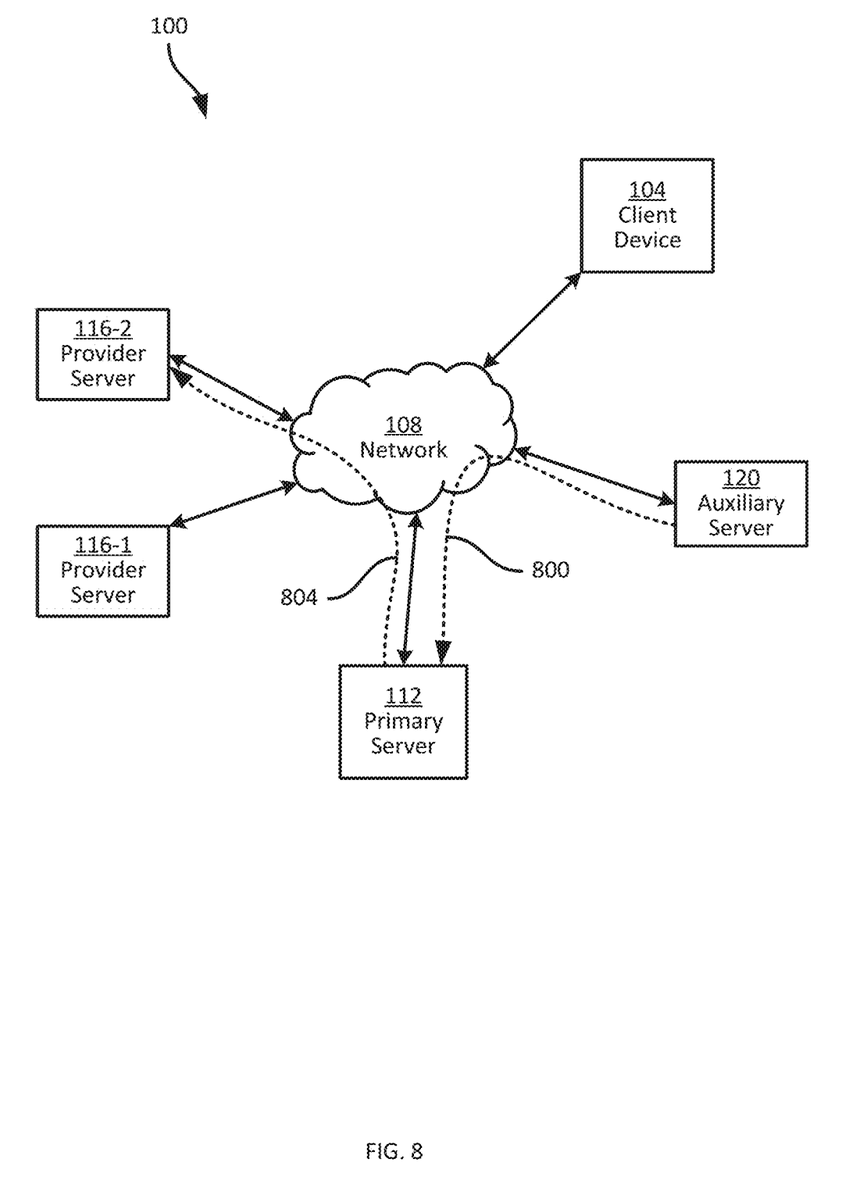
FIG. 8 is a diagram illustrating another example performance of the method of FIG. 3.

Referring to FIG. 8, in other examples, the predicted attribute generated at block 330 can be a likelihood that each of the provider servers 116 will produce relevant response data. For example, in the context of flights, the provider servers 116 may be operated by distinct airlines, and the primary server 112 may be configured to pass the request 400 or portions thereof to each provider server 116. Each provider server 116 may return candidate flight segments satisfying the search parameters of the request 400, and the primary server 112 may perform additional processing to rank, price, combine, or the like, the candidate segments before transmitting the segments to the client device 104.

As will be apparent, some provider servers 116 may be less likely to produce relevant results for a given request 400 than others. For example, an airline that operates primarily in South America may be unlikely to produce relevant results for a flight from North America to continental Europe, as in the request 400. The auxiliary server 120 can therefore generate a probability or binary classification, for each provider server 116, indicating whether the provider 116 is expected to produce relevant response data. For example, the auxiliary server 120 can implement a CNN or other predictive model that generates the above-mentioned prediction.

The auxiliary server 120 can then transmit a modification message 800 to the primary server 112 that contains the identifiers of the providers for which the predicted relevance exceeded a threshold (e.g. met a given binary state, or exceed a certain probability). The primary server 112 can be configured to perform only certain initialization activities, such as retrieving a client profile, prior to receiving the message 800 from the auxiliary server 120. In response to the message 800, the primary server 112 can then send a request 804 to only one provider server 116 (specifically the server 116-2 as shown in FIG. 8) rather than both servers 116.

Figure 9:
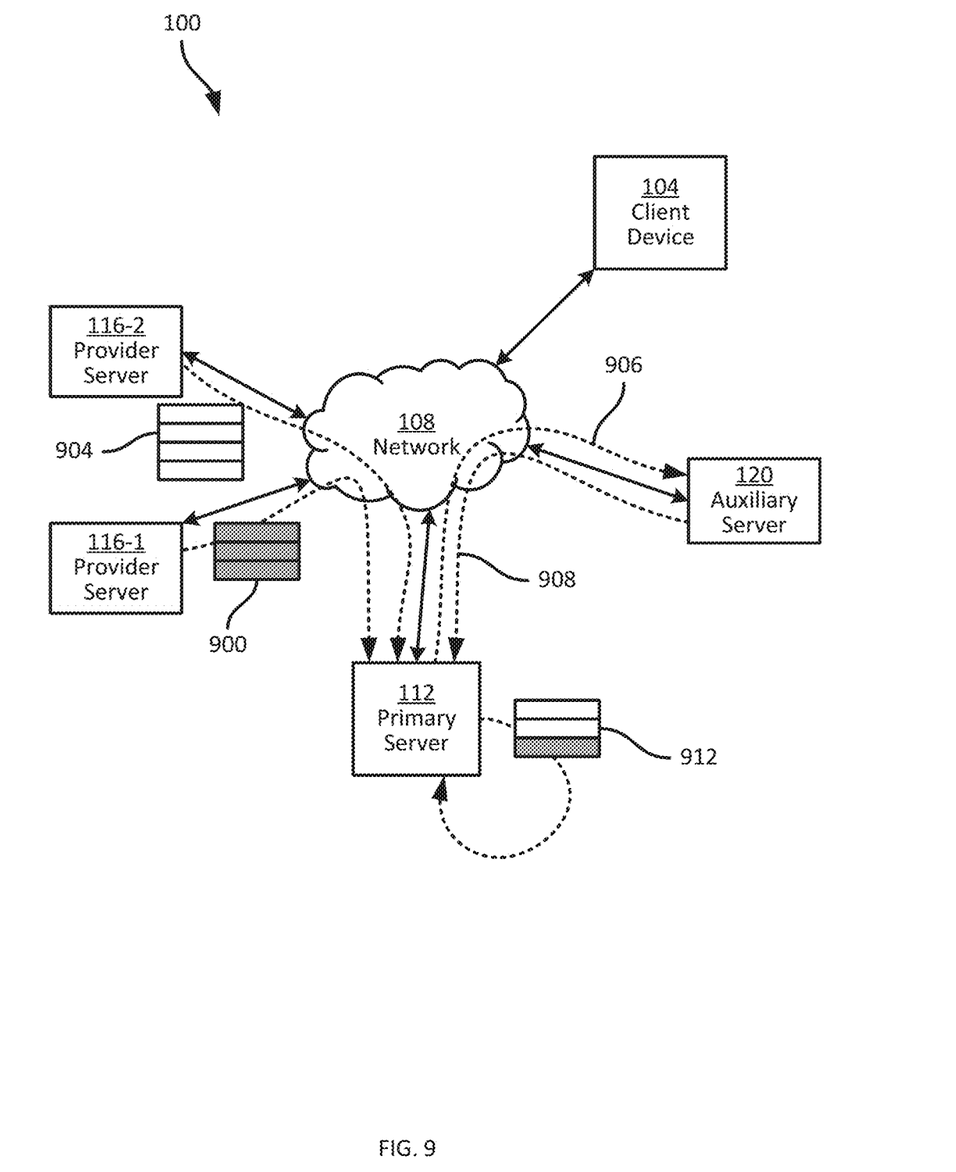
FIG. 9 is a diagram illustrating a further example performance of the method of FIG. 3.

In further examples, referring to FIG. 9, the modification selected by the auxiliary server 120 can be based not only on the request 400, but also on preliminary or intermediate response data. For example, after requests such as the requests 700 shown in FIG. 7 are transmitted to the provider servers 116, the provider servers 116 may each return candidate flight segments (or other forms of response data, depending on the nature of the request 400). For example, as illustrated in FIG. 9, the provider server 116-1 returns a set 904 of candidate segments, and the provider server 116-2 returns a set 904 of candidate segments. The primary server 112 may be configured to perform additional processing on the segments, such as ranking and/or scoring the segments, determining pricing data for the segments, or the like. Such additional processing may also be computationally intensive. Therefore, prior to performing such additional processing, the primary server 112 may transmit the candidates 900 and 904 to the auxiliary server 120, e.g. in a message 906, for encoding via the same process as in block 310, and processing along with the request 400 via a CNN or other predictive model.

The auxiliary server 120 is therefore configured to generate, for each candidate in the sets 900 and 904, a prediction of the relevance for the candidate. The prediction may, for example, indicate whether or not the candidate is expected to be within the five (or ten, or any other suitable predefined number) most relevant candidates, e.g. according to price or any other suitable factor. The modification selected by the auxiliary server 120 may therefore be identifiers of a subset of the sets of candidates 900 and 904. The subset can be transmitted to the primary server 112 via a modification command 908. The primary server 112 can then perform any subsequent processing prior to returning the response data to the client device 104 only on the selected subset, e.g. the subset 912 shown in FIG. 9.

As will be apparent from the examples above, the modifications selected by the auxiliary server generally truncate the processing involved in the generation of response data, whether such truncation involves aborting the response data generation (e.g. as in FIG. 7), reducing the volume of intermediate processing (e.g. as in FIG. 8), or reducing the volume of post-processing (e.g. as in FIG. 9). In some examples, combinations of the above modification mechanisms may be employed. The auxiliary server 120 may, for example, execute several distinct predictive models, one for each type of modification.

As noted earlier, numerical data may be discarded from the request 400 during the encoding process. In some examples, the numerical data may be used as an input to an intermediate attribute prediction. For example, the combined vectors from block 515 may be provided to a CNN as mentioned above, and the output of the CNN may be combined with one or more vectors containing numerical data previously discarded from the request 400 (which may not require embedding via the method 500). The combined data may then be provided to a further classifier executed by the auxiliary server 120, such as a further CNN.

The system 100, and in particular, the operation of the auxiliary server to encode and process data requests alongside the "regular" processing of such requests by the server 112, enables modulation of the primary server 112's response generation, to reduce the computational load involved in response generation and/or improve the accuracy of the generated response data.

The scope of the claims should not be limited by the embodiments set forth in the above examples, but should be given the broadest interpretation consistent with the description as a whole.

The invention claimed is:

1. A method, comprising:
   maintaining a library of vectors each corresponding to one of a set of categorical tokens;
   receiving a search request containing a multi-level structured document;
   extracting a subset of the categorical tokens from the multi-level structured document;
   generating a subset of the vectors defining the multi-level structured document, by:
   (i) for each categorical token in the subset, retrieving a corresponding one of the vectors from the library, and
   (ii) combining the retrieved vectors;
   providing the search request to a primary response generator;
   providing the subset of vectors to a predictor module; and
   based on an output of the predictor module, determining whether to trigger a modification for the primary response generator.

2. The method of claim 1, wherein determining whether to trigger the modification includes determining whether the output of the predictor model indicates that the primary response generator will time out.

3. The method of claim 2, wherein the modification includes providing the search request to an auxiliary response generator.

4. The method of claim 1, wherein the output of the predictor module includes, for each of a plurality of search response providers, a likelihood that the respective provider will provide relevant response data; and
   wherein determining whether to trigger the modification includes, for each provider, determining whether the likelihood is below a threshold.

5. The method of claim 4, wherein the modification includes sending a command to the primary response generator to omit the respective provider.

6. The method of claim 1, wherein combining the vectors includes concatenating the vectors to produce an M×N matrix, where M is a count of the subset of vectors, and where N is a length of each vector.

7. The method of claim 1, wherein extracting the subset of the categorical tokens includes:
   retrieving a syntax definition for the multi-level structured document;
   discarding, based on the syntax, a plurality of value identifiers;
   discarding at least one further string having a frequency in the multi-level structured document below a threshold frequency.

8. A non-transitory computer-readable medium storing a plurality of computer-readable instructions executable by a processor for:
- maintaining a library of vectors each corresponding to one of a set of categorical tokens;
- receiving a search request containing a multi-level structured document;
- extracting a subset of the categorical tokens from the multi-level structured document;
- generating a subset of the vectors defining the multi-level structured document, by:
  - (i) for each categorical token in the subset, retrieving a corresponding one of the vectors from the library, and
  - (ii) combining the retrieved vectors;
- providing the subset of vectors to a predictor module;
- providing the search request to a primary response generator;
- based on an output of the predictor module, determining whether to trigger a modification for the primary response generator.

9. A computing device, comprising:
- a communications interface;
- a memory maintaining a library of vectors each corresponding to one of a set of categorical tokens; and
- a processor configured to:
  - receive, via the communications interface, a search request containing a multi-level structured document;
  - extract a subset of the categorical tokens from the multi-level structured document;
  - generate a subset of the vectors defining the multi-level structured document, by:
    - (i) for each categorical token in the subset, retrieving a corresponding one of the vectors from the library, and
    - (ii) combining the retrieved vectors;
  - provide the search request to a primary response generator;
  - provide the subset of vectors to a predictor module; and
  - based on an output of the predictor module, determine whether to trigger a modification for the primary response generator.

10. The computing device of claim 9, wherein the processor is configured, in order to determine whether to trigger the modification, to determine whether the output of the predictor model indicates that the primary response generator will time out.

11. The computing device of claim 10, wherein the modification includes providing the search request to an auxiliary response generator.

12. The computing device of claim 9, wherein the output of the predictor module includes, for each of a plurality of search response providers, a likelihood that the respective provider will provide relevant response data; and
   wherein the processor is configured, in order to determine whether to trigger the modification, to:
     for each provider, determine whether the likelihood is below a threshold.

13. The computing device of claim 12, wherein modification includes sending of a command to the primary response generator to omit the respective provider.

14. The computing device of claim 9, wherein the processor is configured, in order to combine the vectors, to concatenate the vectors to produce an M×N matrix, where M is a count of the subset of vectors, and where N is a length of each vector.

15. The computing device of claim 9, wherein the processor is configured, in order to extract the subset of the categorical tokens, to:
- retrieve a syntax definition for the multi-level structured document;
- discard, based on the syntax, a plurality of value identifiers;
- discard at least one further string having a frequency in the multi-level structured document below a threshold frequency.

* * * * *